(12) United States Patent
Thelander

(10) Patent No.: US 8,942,915 B2
(45) Date of Patent: Jan. 27, 2015

(54) METHOD FOR IDENTIFYING AN AIRPLANE IN CONNECTION WITH PARKING OF THE AIRPLANE AT A STAND

(75) Inventor: Per Thelander, Hollviken (SE)

(73) Assignee: FMT International Trade AB, Trelleborg (SE)

( * ) Notice: Subject to any disclaimer, the term of this patent is extended or adjusted under 35 U.S.C. 154(b) by 238 days.

(21) Appl. No.: 13/483,251

(22) Filed: May 30, 2012

(65) Prior Publication Data

US 2013/0289866 A1 Oct. 31, 2013

(30) Foreign Application Priority Data

Apr. 30, 2012 (SE) ........................................ 1250430

(51) Int. Cl.
*G06F 7/76* (2006.01)
(52) U.S. Cl.
USPC ...... 701/120; 701/1; 701/3; 701/28; 701/411; 701/514; 244/114 R; 244/137.1; 244/135 A; 244/50; 244/115
(58) Field of Classification Search
CPC ................ B64F 1/00; B64F 1/54; B64F 1/65; G01S 17/42; G01S 17/89; G01S 5/16; G01S 11/12
USPC ........ 701/1, 3, 28, 411, 466, 514; 244/114 R, 244/137.1, 135 A, 50, 115
See application file for complete search history.

(56) References Cited

U.S. PATENT DOCUMENTS

| 4,629,325 | A | | 12/1986 | Bergkvist et al. | |
|---|---|---|---|---|---|
| 6,100,964 | A | * | 8/2000 | De Cremiers | 356/4.01 |
| 6,324,489 | B1 | * | 11/2001 | Millgård | 702/151 |
| 6,807,511 | B2 | * | 10/2004 | Millgård | 702/151 |
| 7,069,612 | B1 | | 7/2006 | Anderberg | |
| 7,093,314 | B2 | * | 8/2006 | Hutton et al. | 14/71.5 |
| 2002/0030609 | A1 | * | 3/2002 | Baumgartner et al. | 340/958 |
| 2003/0160710 | A1 | * | 8/2003 | Baumgartner et al. | 340/958 |
| 2003/0208860 | A1 | * | 11/2003 | Hutton et al. | 14/71.5 |
| 2003/0208861 | A1 | * | 11/2003 | Hutton et al. | 14/71.5 |
| 2004/0019984 | A1 | * | 2/2004 | Hutton | 14/71.5 |
| 2004/0187234 | A1 | * | 9/2004 | Hutton et al. | 14/71.5 |
| 2004/0237224 | A1 | * | 12/2004 | Hutton | 14/71.5 |
| 2006/0066470 | A1 | * | 3/2006 | Anderson et al. | 342/29 |
| 2007/0210952 | A1 | * | 9/2007 | Hutton | 342/23 |

(Continued)

FOREIGN PATENT DOCUMENTS

| SE | 426987 B | 2/1983 |
|---|---|---|
| SE | 503396 C2 | 6/1996 |

*Primary Examiner* — John R Olszewski
*Assistant Examiner* — Truc M Do
(74) *Attorney, Agent, or Firm* — Young & Thompson

(57) ABSTRACT

Method for identifying an airplane in connection to parking of the airplane at a gate or a stand, for possible connection of a passenger bridge (1) or a loading bridge to a door of an airplane, where the airplane is positioned and stopped at a predetermined position using a touchless measurement of the distance between the airplane and a fixed point, where the distance is indicated on a display (6) mounted in front of the pilot of the airplane on for instance an airport building (7), which display (6) shows the position of the airplane (5) in relation to a stop point for the airplane and shows the current airplane type, where the distance measurement and display are caused to be activated by a computer system (20) belonging to the airport or manually, and wherein an antenna (16) is caused to receive information (17) transmitted by an airplane.

6 Claims, 3 Drawing Sheets

(56) References Cited

U.S. PATENT DOCUMENTS

| | | |
|---|---|---|
| 2007/0219710 A1* | 9/2007 | Hutton ........................ 701/207 |
| 2008/0172178 A1* | 7/2008 | Anderson et al. ............ 701/301 |
| 2008/0217475 A1* | 9/2008 | Allison ..................... 244/114 R |
| 2008/0231472 A1 | 9/2008 | Hutton |
| 2009/0217468 A1 | 9/2009 | Anderberg |
| 2009/0295622 A1* | 12/2009 | Anderson et al. ............... 342/71 |
| 2011/0087417 A1* | 4/2011 | Anderson et al. ............... 701/96 |

* cited by examiner

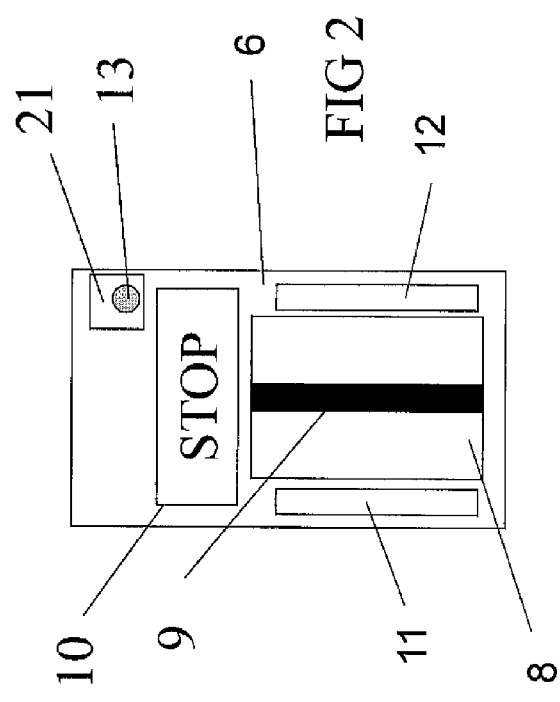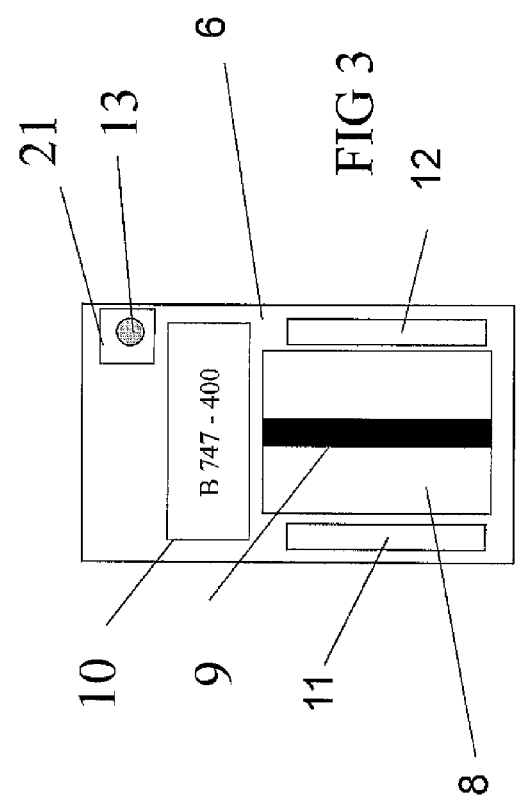

METHOD FOR IDENTIFYING AN AIRPLANE IN CONNECTION WITH PARKING OF THE AIRPLANE AT A STAND

BACKGROUND OF THE INVENTION

1. Field of the Invention

The present invention relates to a method for identifying an airplane in connection to docking of the airplane at a stand.

2. Description of the Related Art

Many airports have passenger bridges which are connected to an airplane from a terminal building and through which passengers walk to and from the airplane. There are several different types of such passenger bridges, of which one type is a so called Mobile Telescopic Bridge (MTB), which consists of a number of telescopic parts, where the outermost part is supported by a bogie with separately driven wheels. Using this bogie, the passenger bridge is maneuvered on the airport apron tarmac to and from an airplane. At the connection of the passenger bridge to a terminal building, there is a rotunda which can be turned about a vertical axis and which is supported by a pillar which is firmly established in the ground. In the outermost part of the passenger bridge, there is a cabin which can be turned relative to the outermost telescopic element of the passenger bridge. The cabin is the part which is arranged to be connected to the door of an airplane.

Another type is a fixedly mounted bridge with an outer telescopable part, which is connected to the said cabin, and an inner part which is connected to a fixed support.

When docking of an airplane to a passenger bridge, it is known to touchlessly measure the distance from a docking system, comprising a distance measurement device, to the airplane. Usually, the docking system is mounted on a terminal building. Furthermore, it is known to indicate to the pilot the position of the airplane in relation to the central line along which the airplane is to move towards a stop point, where said cabin is to be connected to the airplane door. These devices are located in a device belonging to the docking system and which is provided with a display.

The display is positioned a certain distance up on the wall of the terminal building, in the extension of the central line, or on an independent construction.

The distance measurement is used in order to indicate the said stop point to the pilot. The stop point may be individual for different airplanes, and can thus lie at various distances from the distance measuring device used. Such a docking system is presumed to know what type and version of airplane which is to dock, and thereby the distance between the distance measuring device and a specific part of the airplane, among other things in order to avoid accidents because of for instance one of the wings of the airplane colliding into the passenger bridge in question or into any other object, as a result of the location of the stop point being indicated as too close to, for example, the terminal building. Namely, the positioning of for instance the wings can differ across various versions of a certain type of airplane.

The technology which nowadays is most often used to measure the distance is distance measuring lasers.

A very common way to indicate to the pilot the location of the airplane in relation to the central line is that the display is provided with a leading mark indicator according to Swedish patent no. 8105509-7.

After the airplane has stopped in its stop position, the cabin of the passenger bridge is to be connected to the airplane door.

In the Swedish patent no. 503 396, a way to automatically connect a passenger bridge to an airplane is described.

In case the connection is to take place completely automatically, and to be correct, the type and version of the airplane must be established. The placement of the doors along the airplane body may vary across different versions of airplanes of the same type.

Data relating to the type and version of the airplane, input into a supervisory or central computer system, are normally presumed to be correct. However, experience proves that such data in a central computer system, for example the data system FIDS (Flight Information and Display System) and/or in a local computer system, for example Apron Management System, which is used to assign arriving airplanes a stand in which it is to be parked, is not always correct.

In some cases, airplane type and version are indicated locally without connection to supervisory systems, why a risk of incorrect input of data is present.

BRIEF SUMMARY OF THE INVENTION

The present invention solves both the above described problems.

Method for identifying an airplane in connection to parking of the airplane at a stand, for possible connection of a passenger bridge or a loading bridge to a door of an airplane, where the airplane is positioned and stopped at a predetermined position using a touchless measurement of the distance between the airplane and a fixed point, where the distance is indicated on a display mounted in front of the pilot of the airplane on for instance an airport building, which display is caused to show to the pilot the position of the airplane in relation to a stop point for the airplane and to show the current airplane type and version, where the said distance measurement and display are caused to be activated by a computer system belonging to the airport or manually, and wherein an antenna is caused to receive information transmitted by an airplane, and is characterized in that at least the identification number of the airplane and the longitudinal and latitudinal coordinates of the airplane are extracted from said information, in that information regarding the airplane type and version in question for a certain identification number is obtained from a database in which the identification numbers of airplanes are stored, which information is transferred to a control system for the said display, and in that the control system is caused to control the said display at the stand at which an airplane is to park and, on the display, indicate airplane type and version.

BRIEF DESCRIPTION OF THE DRAWINGS

Below, the invention is described in closer detail, partly in connection to the appended drawings, in which FIGS. 2 and 3 show a display which is intended to indicate information to a pilot in a docking airplane

DETAILED DESCRIPTION OF THE PREFERRED EMBODIMENTS

Figure 1:
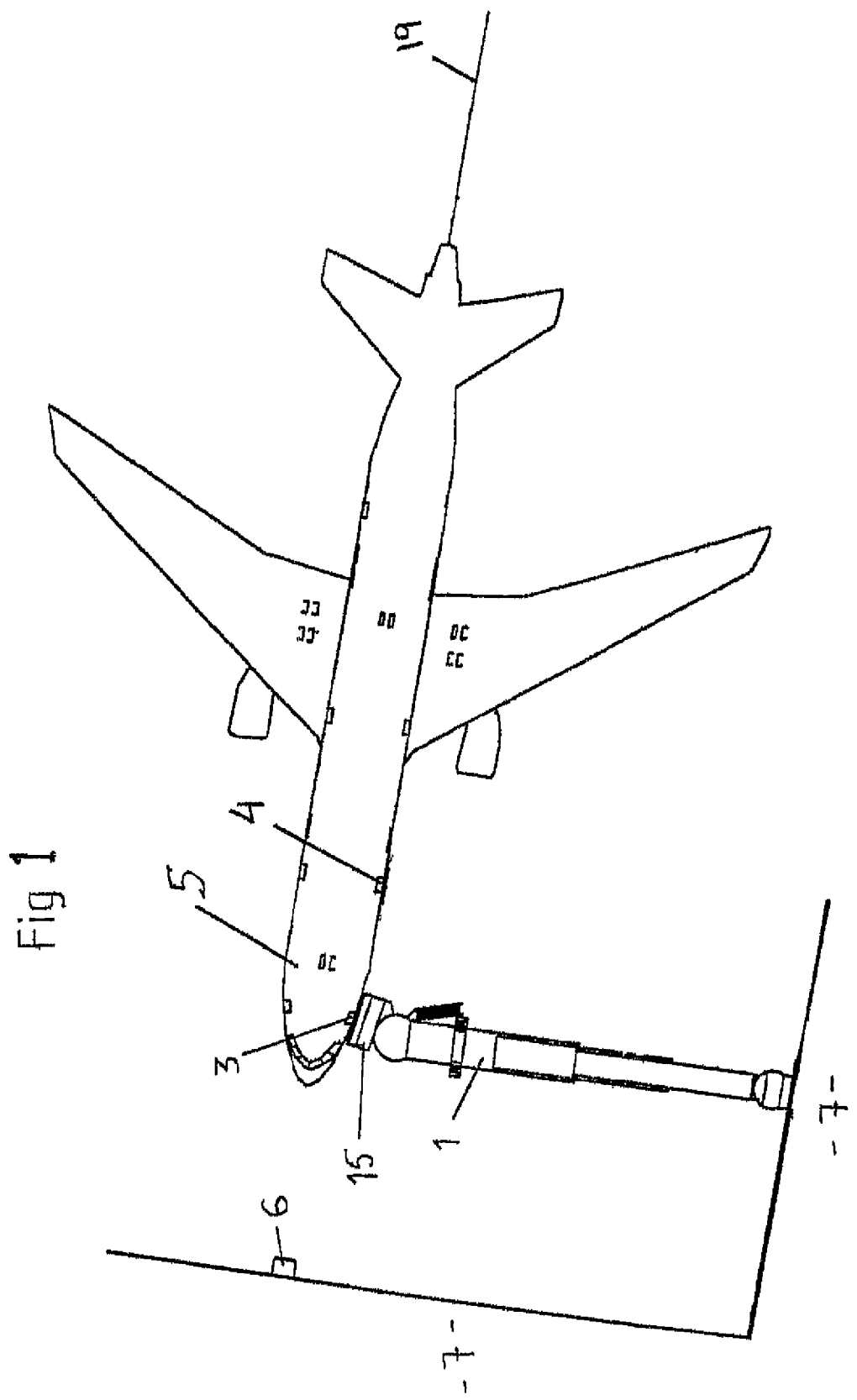
FIG. 1 shows a schematic plane view of an airplane and a passenger bridge

The present invention is a method for identifying an airplane in connection to parking of an airplane at an assigned stand, and a possible connection of a passenger bridge 1 or a loading bridge to a door 3, 4 of an airplane 5, at a stand, at an airport.

The airplane is positioned and stopped in a predetermined position using a known touchless measurement of the distance between the airplane and a fixed point, where the distance is indicated at a display 6 mounted in front of the pilot of the airplane on for instance an airport building 7. The display 6 is caused to show to the pilot the position of the airplane 5 in relation to a stop point for the airplane, and to show current airplane type and version. A distance measuring device 13 and the said display 6 are caused to be activated by a computer system belonging to the airport, or manually, in a conventional way. Furthermore, the passenger bridge 1 has a control unit 15 arranged among other things to control the movements of the passenger bridge.

As regards the distance measurement, this usually takes place using an IR laser system, but a camera can also be used. The laser is arranged in connection to the display 6. The laser can be arranged to emit measurement pulses stepwise in different angles in the horizontal and vertical planes, in order to thereby sense a predetermined measurement volume. The emission takes place by the laser having one or more movable mirrors towards which laser pulses are directed.

Known systems for measurement towards airplanes using similar laser technology comprise a piece of software, by the use of which it sometimes is possible to verify that one is measuring towards an incoming airplane.

Measurement takes place at different height zones above ground when an airplane is due for arrival. When such beams are reflected, an airplane is deemed to have been detected.

However, said touchless measurement of distances can also be caused to measure the position of the airplane in relation to the said central line. This can take place by the scanning laser being arranged to scan vertically and horizontally, in other words in two dimensions.

In FIG. 2, the said conventional display 6 is shown schematically. The laser is marked in FIGS. 2 and 3 by 13, and a window 21 through which laser beams are emitted and received. The numeral 8 references a leading mark indicator according to Swedish patent no. 8105509-7, which builds upon moiré technology. When the airplane is located at the central line, the pilot sees a vertical black line 9 on the leading mark indicator 8. Such known displays 6 are also provided with text fields 10 where among other things the airplane type and version which is expected to arrive to the current stand is stated. Furthermore, such displays 6 comprise one or several luminous columns 11, 12 which illustrate to the pilot in an analogue manner how quickly he is approaching the stop point.

Such distance measuring devices and displays can be connected to a central computer system, which is central with respect to the airport, in which system among other things information exists about the airplane type and version, and about where the airplane is to park.

In case the pilot accepts the airplane type and version shown by the display 6, as mentioned above, the pilot drives the airplane further onwards to the stop point, which is indicated by the display 6, at which the airplane is stopped. In case the pilot sees that the airplane type and/or the version of the airplane type shown by the display 6 is or are not correct, the pilot shall immediately stop the airplane.

In case the pilot continues to drive the airplane, despite that an incorrect airplane type and version are shown, the said device shall prevent this by displaying STOP or change to the correct airplane type and version.

In FIG. 3, this is illustrated by the text B 747-400 being shown in the text field on the display 6. B 747 indicates the airplane type Boeing 747, and 400 indicates what version of 747 is intended. Depending on the version, the placement of the doors on the airplane body may vary, like in some cases the placement of the wings.

When the airplane has reached its stop point, this is indicated by the text "STOP" being shown in the text field 10, see FIG. 2.

As mentioned above, the indicated airplane type and version in a central computer system or by manual selection is not always in correspondence with the arriving airplane type and version, which leads to risks of accidents. Airplanes transmit information comprising a plurality of parameters, which vary depending on the communication system used by the airplane, but the information comprises the identification number of the airplane which is unique to the airplane, and by the use of which the correct airplane type and version can be obtained from a database. Furthermore, the information can comprise flight number, altitude etc. An antenna 16 at the airport is caused to receive such information 17 transmitted from airplanes, see FIG. 4.

The airplanes can transmit the information at even intervals. Moreover, the airplanes can be arranged to transmit the information upon request, in the form of a request signal transmitted from an airport or airport control.

According to the invention, from the information received by the antenna, at least the identification number, the longitudinal and latitudinal coordinates of the airplane are extracted. Preferably, the coordinates are established using GPS (Global Positioning System) in a conventional way. Information regarding the current airplane type and version is obtained from a database in which the identification numbers of the airplanes are stored, and is transmitted to the said control system 18, see FIG. 4, after which the control system is caused to control the said display 6 at the gate, or stand, at which an airplane is to park, and show the airplane type and version in a text field 10 on the display.

According to a preferred embodiment, the current flight number can be extracted from information transmitted by the airplane.

This mode of procedure assures that the correct airplane type and version is indicated on the display, and that the distance measuring device is arranged to indicate the correct stop point for the airplane.

Figure 4:
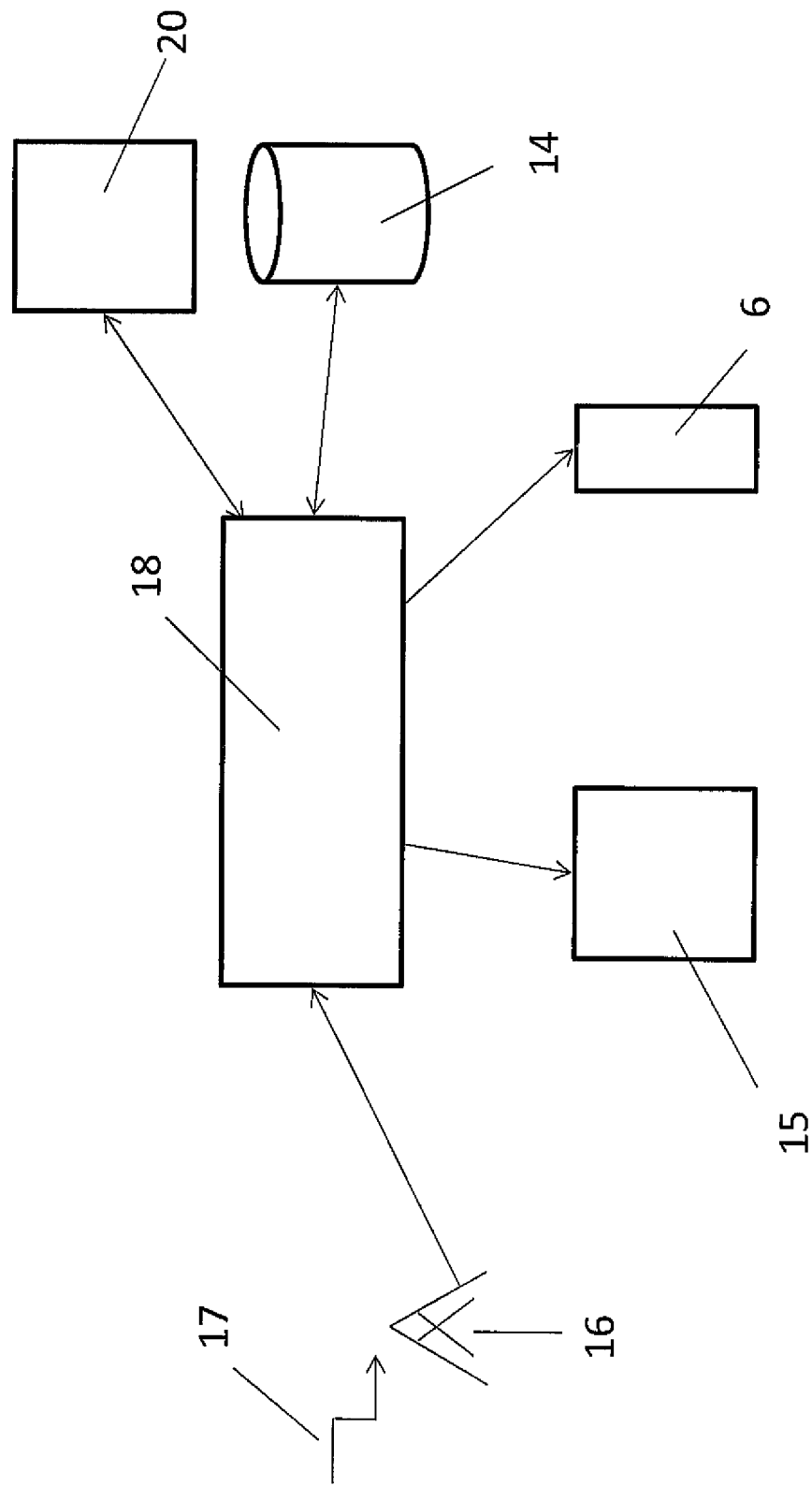
FIG. 4 shows a block diagram.

It is preferred that the said antenna 16, FIG. 4, is caused to receive information 17 transmitted from the airplane according to the ADS-B (Automatic Dependent Surveillance Broadcast) system. In accordance with this system, the airplane transmits the information in a non-directional manner. This results in that the said antenna 16 can be common to the communication with all airplanes at the airport. The airplane transmits on the frequency 1090 MHz.

A very preferred embodiment is that when an airplane is detected in front of the said display, the information from the said antenna is compared to the coordinates which are valid within the said stand, alternatively within a narrow area around and along the central line, and when there is correspondence, a control system 18 belonging to the display 6 is caused to allow that the airplane is brought to the stop point.

This embodiment implies that a confirmation is received that the airplane which is to dock at a certain gate is heading towards the stop point, since the identification number of the airplane is part of the information containing the longitudinal and latitudinal coordinates of the airplane.

It is preferred that the information about expected airplane type and version for control of the said distance measuring device and display can be obtained from the said central computer system 20.

The said access to the positions of the airplane doors on different airplane types and versions can exist in a memory belonging to the control system 18, or be obtained by the control system 18 from a database 14 belonging to the central computer system 20.

When the airplane has stopped at the stop point, according to a preferred embodiment the computer system is caused to direct, via a control unit 15 belonging to the passenger bridge 1, the passenger bridge to a position in which it connects to the door of the airplane. Using the invention, this can be accomplished with very high security, since it is established what type and version the airplane belongs to, as well as where the airplane is parked.

Above, a number of embodiments have been described. However, it is apparent that the invention can be modified regarding the radio communication and what databases and computer system that cooperate.

Therefore, the present invention shall not be limited to the above described embodiments, but may be varied within the scope of the enclosed claims.

The invention claimed is:

1. A method for identifying an airplane in connection to parking of the airplane at a gate or a stand, for possible connection of a passenger bridge or a loading bridge to a door of the airplane, where the airplane is to be positioned and stopped at a predetermined position using a touchless measurement of a distance between the airplane and a fixed point, the distance being indicated on a display mounted in front of the airplane at which a pilot is configured to be situated, the display being configured to display a position of the airplane in relation to a stop point for the airplane and to display a current airplane type, the distance measurement and the display being configured to be activated by a computer system of an airport at which the airplane is located or manually activated, the method comprising:

receiving, by an antenna at the airport, information transmitted by the airplane;

extracting at least an identification number of the airplane and longitudinal and latitudinal coordinates of the airplane from the information;

obtaining information regarding the current airplane type and an airplane version for the extracted identification number from a database in which identification numbers of airplanes are stored;

transferring the information regarding the airplane type and the airplane version to a control system for the display;

controlling, by the control system, the display at the gate or the stand at which the airplane is to park to display the airplane type and the airplane version;

detecting that the airplane is in front of the display;

comparing the longitudinal and latitudinal coordinates received from the antenna and extracted from the information with valid longitudinal and latitudinal coordinates within the stand when the airplane is detected to be in front of the display; and controlling, by the control system, the display to allow that the airplane is brought to the stop point when the longitudinal and latitudinal coordinates received from the antenna and the valid longitudinal and latitudinal coordinates are the same.

2. The method according to claim 1, further comprising receiving, by the antenna, information transmitted from the airplane according to an Automatic Dependent Surveillance Broadcast (ADS-B) system.

3. The method according to claim 1, wherein, when the airplane has been stopped at the stop point, a control unit belonging to the passenger bridge controls the passenger bridge to a position in which the passenger bridge connects to the door of the airplane.

4. The method according to claim 1, wherein a current flight number is extracted from the information transmitted from the airplane.

5. The method according to claim 1, wherein the display is mounted on an airport building.

6. The method according to claim 1, wherein the information transmitted by the airplane and received by the antenna is transmitted automatically.

* * * * *